United States Patent [19]

Kokorowski

[11] 4,348,586
[45] Sep. 7, 1982

[54] AUTOMATIC BANDWIDTH CONTROL SYSTEM

[75] Inventor: Stanislaw A. Kokorowski, Canoga Park, Calif.

[73] Assignee: The United States of America as represented by the Secretary of the Air Force, Washington, D.C.

[21] Appl. No.: 185,472

[22] Filed: Sep. 9, 1980

[51] Int. Cl.³ .............................................. H01J 40/14
[52] U.S. Cl. ................................. 250/214 R; 455/619
[58] Field of Search .................. 250/201, 204, 214 R; 455/609, 604, 611, 619

[56] References Cited

U.S. PATENT DOCUMENTS 3,968,361  7/1976  Bumgardner ..................... 250/214
4,262,366  4/1981  Eumurian ............................ 455/619

Primary Examiner—David C. Nelms
Attorney, Agent, or Firm—Donald J. Singer; William Stepanishen

[57] ABSTRACT

An automatic bandwidth control system for an adaptive optics servo utilizing an adjustable amplitude low frequency sinusoidal dither signal to optimize the servo bandwidth for a particular target scenario thereby minimizing bandwidth-related degradation.

6 Claims, 5 Drawing Figures

AUTOMATIC BANDWIDTH CONTROL SYSTEM

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to servo systems, and in particular to an automatic bandwidth control system for an adaptive optics servo.

In general, a servo system by definition is a combination of elements for the control of a source of power in which the output of the system or some function of the output is fed back for comparison with the input and the difference between these quantities is used in controlling the power. With the advent of the laser, servo systems and optics have been combined for various system applications. One of which applications is controlling a laser to scan a target or an area to provide data thereabout. Such systems basically use the laser as an optical device to obtain information or data for various purposes. The servo portion of the system is utilized to maintain the laser on target and to provide optimum illumination of said target.

In system utilizing coherent optical adaptive techniques, speckle degradation is only one source of bandwidth degrations. Additional bandwidth-related problems that occur are caused by atmospheric turbulence, and interference between adjacent channels of multidither coherent optical adaptive techniques frequency channels. The fundamental problem is that the target irradiance which is produced by coherent optical adaptive techniques system, does vary with bandwidth. Furthermore, this variation is scenario dependent and therefore the severity of the irradiance, or Strehl ratio degradation which results from a given change in bandwidth can be either very severe or hardly noticeable. In order to maintain a high Strehl ratio for the turbulence scenario it is desirable to adjust the bandwidth to a high value in the vicinity of 1000 to 1200 Hz, whereas in the speckle scenario a very low bandwidth is desired. In the combined scenario a moderate bandwidth of about 600 to 800 Hz is the most desirable. The present invention automatically selects the optimum bandwidth for any scenario and keeps adjusting it as the scenario changes, always maintaining the highest Strehl ratio possible.

SUMMARY OF THE INVENTION

The present invention utilizes a bandpass filter circuit to extract an AC gain signal which is multiplied by a gain factor to provide an AC servo response signal. A unit sine wave which is operating at the servo system frequency is multiplied with the AC servo response signal to provide a DC gain correction signal whose polarity represents the direction of the system's response to target acquisition. A pair of limiter units are utilized to maintain the DC gain correction signal within predetermined limits. An AC dither signal which is generated by multiplying the unit sine wave with an AC gain modulation factor, is added to the DC gain correction signal to provide the servo gain control signal.

It is therefore one object of the present invention, therefore, to provide an improved automatic bandwidth control system for an adaptive optics systems.

It is another object of the invention to provide an improved automatic bandwidth control system for minimizing the effects of speckle in a coherent optical adaptive technique system.

It is another object of the invention to provide an improved automatic bandwidth control system to optimize an adaptive optics system performance by adjusting servo bandwidth.

It is still another object of the invention to provide an improved automatic bandwidth control system for automatically selecting the optimum bandwidth for any target scenario and adjusting it as the scenario changes.

It is yet another object of the invention to provide an improved automatic bandwidth control system for maintaining the highest Strehl ratio for any given scenario.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
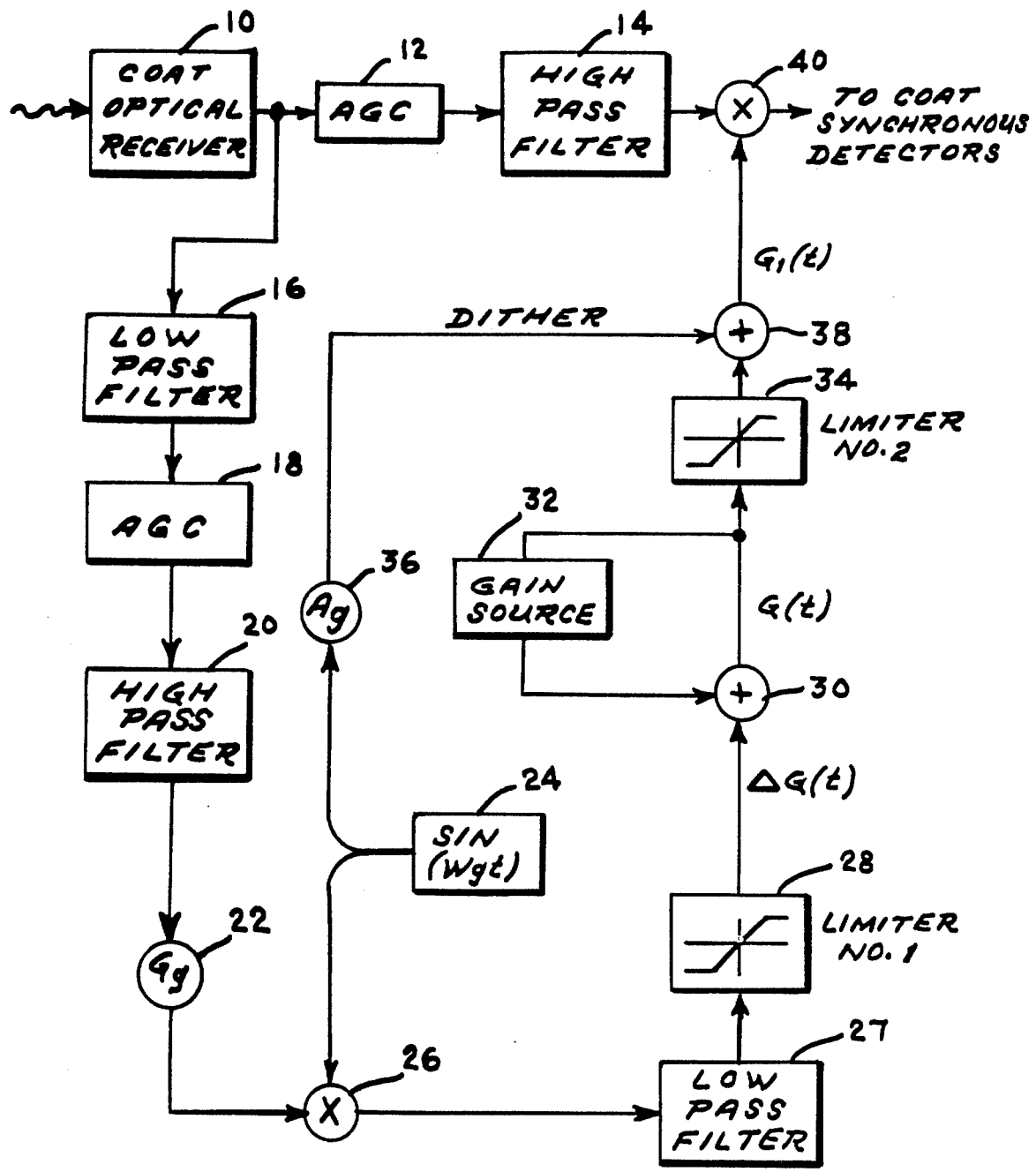
FIG. 1 is a block diagram of the automatic bandwidth control system in accordance with the present invention.

Referring now to FIG. 1, there is shown an automatic bandwidth control system in conjunction with a coherent optical adaptive techniques (COAT) optical receiver unit 10. Other units in the COAT system include an automatic gain control (AGC) unit 12, a high pass filter unit 14, and synchronous detectors (not shown). The COAT optical receiver unit 10 which receives a target backscatter signal at its input, detects the optical signal and provides a photodetected signal in response thereto. The photodetected signals is applied to a DC restoring bandpass filter in the bandwidth control system. The DC removing bandpass filter unit comprises a low pass filter unit 16, an AGC unit 18, and a high pass filter unit 20. The low pass filter unit 16 passes signals at or below the dither frequency, $\omega_g$, of the gain control loop. The AGC unit 18 maintains the signal level within predetermined narrow limits. The high pass filter unit 20 removes any low frequency components which may be present below the dither frequency, $\omega_g$. A signal multiplier unit 22 multiplies the bandpassed modulation signal by an AC gain factor, $G_g$ to provide an AC gain correction signal. A sine wave generator unit 24 which generates a unit amplitude sine wave at the dither frequency, $\omega_g$, is connected to multiplier unit 26. The AC gain correction signal and the unit amplitude sine wave are multiplied together in multiplier unit 26 to provide a DC gain correction signal.

The DC gain correction signal is applied to a low pass filter unit 27 to remove any high frequency noise that may be present. The DC gain correction signal is applied to a first limiter unit 28 to limit the amplitude of the signal to a predetermined level and to keep interfering noise low by removing excessive amplitude variation from the signal. The output signal from the first limiter unit 28 is a gain correction signal, G(t) which is applied to an adder unit 30 wherein a gain factor from a gain unit 32 is added to the gain correction signal, ΔG(t). The output from the adder unit 30 is a gain signal, G(t) which is applied to a second limiter unit 34 to further maintain the signal within a set of predetermined values.

The unit amplitude sine wave from sine wave generator unit 24 is applied to the multiplier unit 36 wherein an AC gain amplitude factor is modulated onto the sine wave to provide a dither signal. The dither signal and the gain signal, G(t) are added together in added unit 38 to provide a COAT system loop gain signal, $G_1(t)$. The COAT system loop gain signal, $G_1(t)$ is applied to multplier unit 40 wherein it is multiplied with the COAT photodetected signal after it has passed through both the AGC unit 12 and the high pass filter unit 14. The output from the multiplier unit 40 is applied to the COAT synchronous detectors of the COAT system.

The COAT servo bandwidth is adjusted by changing the loop gain parameter, $G_1$, just prior to the COAT synchronous detectors. The gain is sinusoidally dithered at a low frequency $\omega_g$ (about 10 to 50 Hz) with an adjustable amplitude, $A_g$. This causes a modulation in the target reflected intensity which was received by the COAT optical receiver 10 and is also at a frequency $\omega_g$. The amplitude of this modulation is proportional to the partial derivative, $$\delta I_T/\delta f_s,$$

where $I_T$ is the target irradiance and $f_s$ is the COAT servo bandwidth. This partial derivative may have almost any value, depending on the target scenario. When this modulation is synchronously detected the automatic bandwidth control system correction signal thus generated, can also have almost any value, and therefore, a gain parameter $G_g$ is inserted in the automatic bandwidth control system loop. This gain parameter $G_g$ is always adjusted to a very high level so that the synchronously detected signal will always be much higher than required. A first signal limiter 28 which is used after the low pass filter 27, eliminates the undesirable high frequencies that are generated at the synchronous detector 26, in order to reduce the signal magnitude to a lower level. The output from the limiter, therefore, almost always has a constant signal magnitude, which can be adjusted for smooth servo operation, and it always has the correct polarity for gain correction because the polarity is the same as the partial derivative, $$\delta I_T/\delta f_s.$$

This signal is in fact a rate signal which continuously adjusts the COAT gain parameter at a constant rate but in either a positive or negative direction. The second limiter 34 is used to insure that the gain parameter remains between two initially selected limits.

Figure 2:
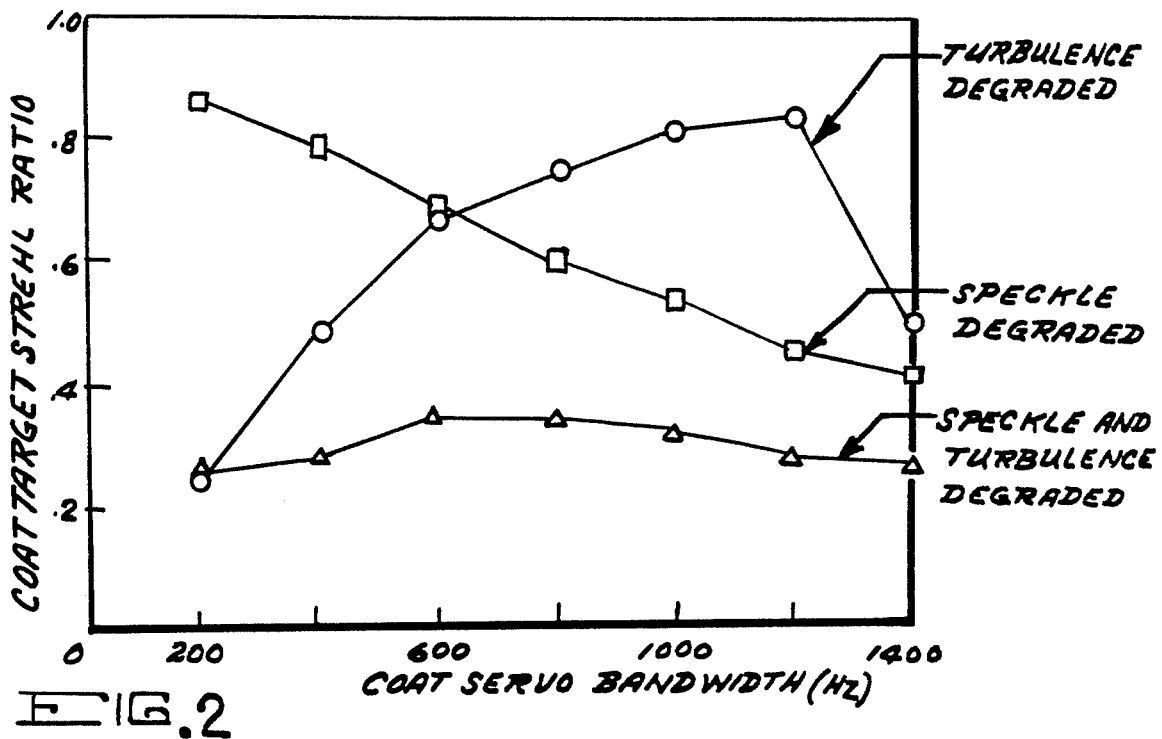
FIG. 2 is a graphical representation of a typical coherent optical adaptive techniques system versus various types of system degradations.
Figure 3:
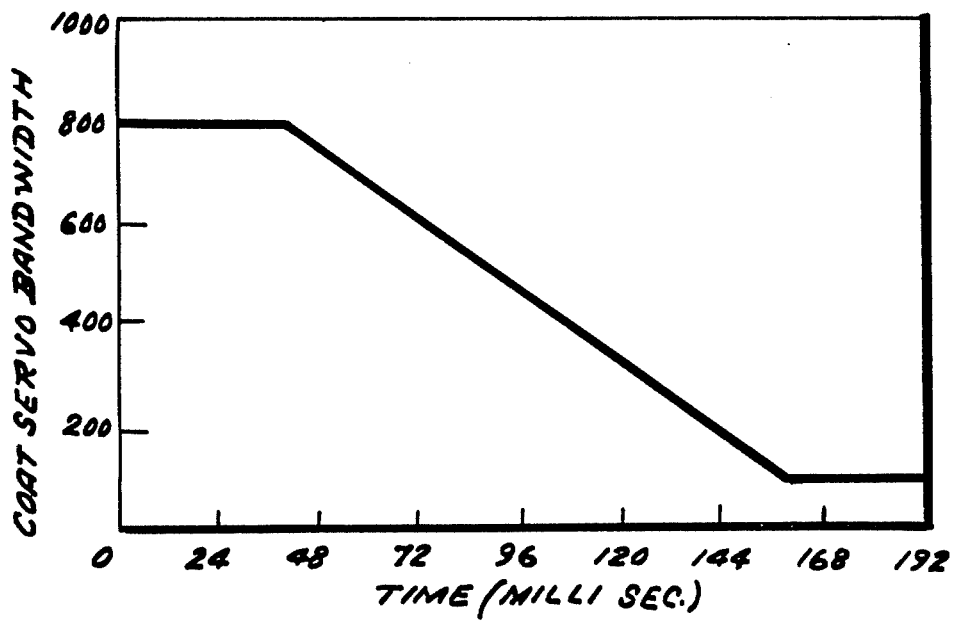
FIG. 3 is a graphical representation of the automatic bandwidth control system performance against speckle.
Figure 4:
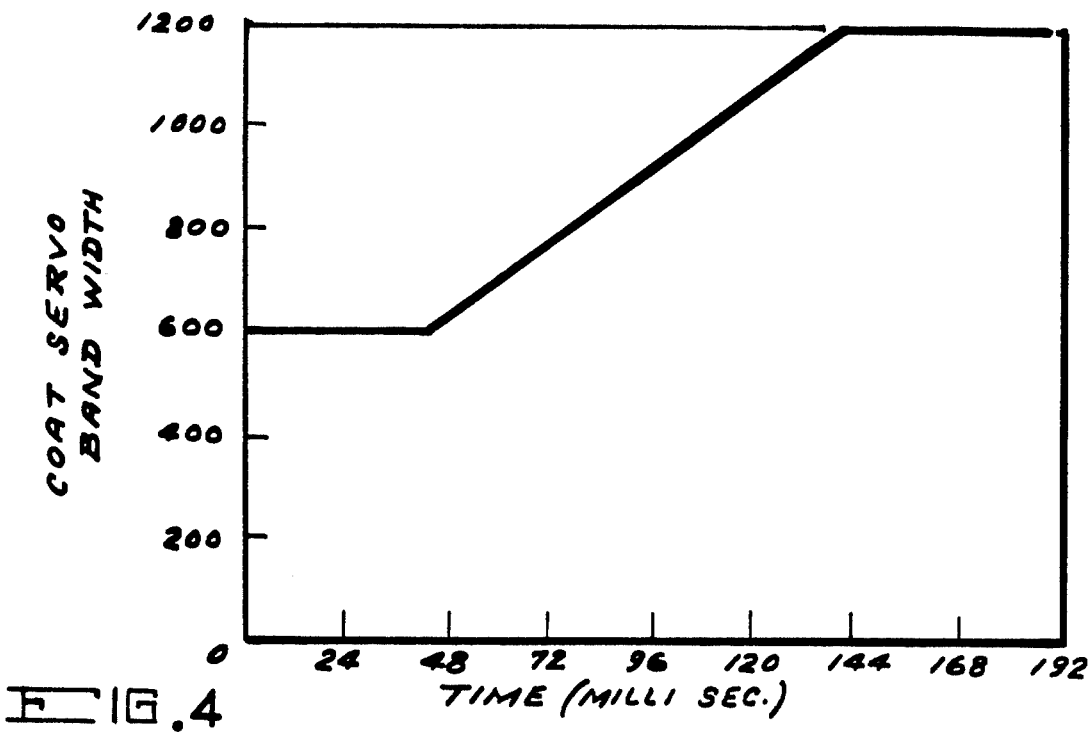
FIG. 4 is a graphical representation of the automatic bandwidth control system performance against turbulence.
Figure 5:
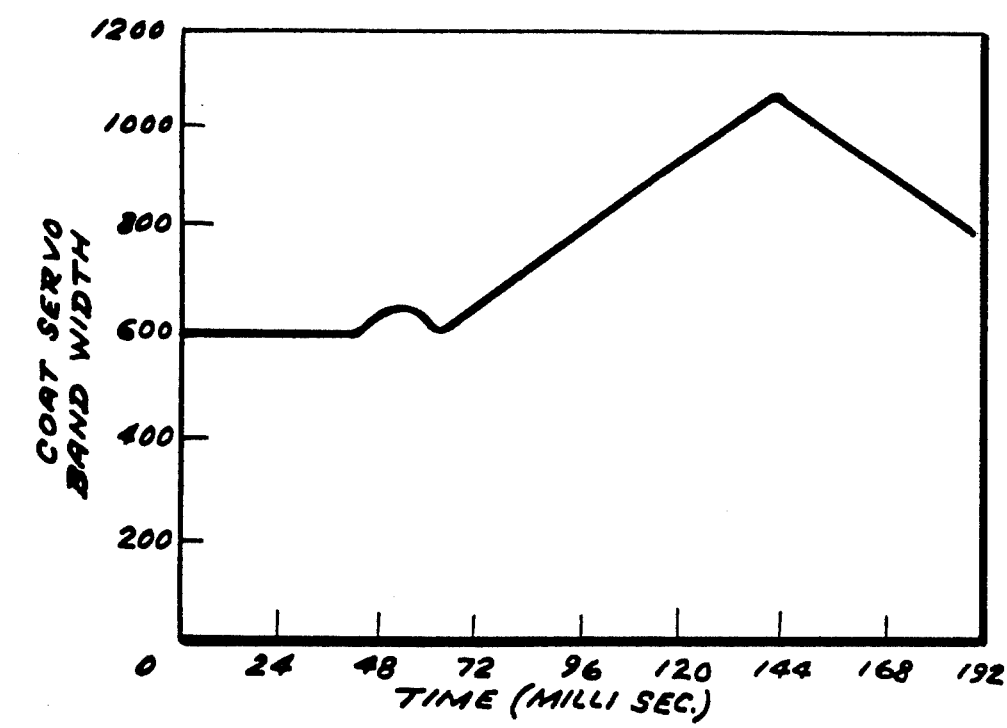
FIG. 5 is a graphical representation of the automatic bandwidth control system performance against turbulence and speckle.

In FIGS. 3, 4 and 5, there is shown some examples of computer simulation runs with a closed loop autmoatic bandwidth conrol system in a COAT servo loop, operating against the same degradations used in FIG. 2. In FIG. 3 the COAT system is subjected to speckle degradation only. The bandwidth has been initialized to 800 Hz. As the simulation proceeds it may be seen that the automatic bandwidth control system reduces the gain to 100 Hz, which is the minimum allowed by limiter No. 2. In FIG. 4, it may be seen that the COAT system is subjected to the turbulence-like degradation. When the bandwidth is initialized to 600 Hz and then the automatic bandwidth control system is allowed to take over. It may be noted in FIG. 4 that the bandwidth was increased to 1200 Hz, which was the maximum allowed by limiter No. 2. In FIG. 5, it may be seen that the COAT system is subjected to both degradations simultaneously. The bandwidth for this simulation ranges between 600 and 1000 Hz, which is consistent with the expected behavior based on FIG. 1.

Although the invention has been described with reference to a particular embodiment, it will be understood to those skilled in the art that the invention is capable of a variety of alternative embodiments within the spirit and scope of the appended claims.

What is claimed is:

1. An automatic bandwidth control system for an adaptive optics servo comprising in combination:
    a bandpass filter means receiving a photodetected signal, said bandpass filter means removing unwanted high and low signals, said bandpass filter means maintaining a predetermined signal level,
    a gain parameter means receiving the output signal from said bandpass filter means, said gain parameter means multiplying said output signal by a gain parameter to provide a gain correction signal,
    a modulation means operating at a dither frequency, $\omega_g$, said modulation means providing a modulation signal,
    a multiplier means receiving said gain correction signal and said modulation signal, said multiplier means providing a DC gain correction signal,
    a low pass filter means receives and filters said DC gain correction signal to remove noise and unwanted signals,
    a first limiter means receives said DC gain correction signal from said low pass filter means to maintain the signal within predetermined limits,
    a gain source provides a gain factor that is added to said DC gain correction signal to provide a gain signal,
    a second limiter means receives said gain signal and limits said gain signal to a predetermined level,
    a gain modulation means receives said modulation signal, said gain modulation means multiplies said modulation signal by an amplitude factor to provide a dither signal, and
    an adder means receives and adds together said dither signal and said gain signal to provide a bandwidth correction signal.

2. An automatic bandwidth control system as described in claim 1 wherein said modulation signal comprises a unit amplitude sine wave.

3. An automatic bandwidth control system as described in claim 1 wherein said bandpass filter means comprises a low pass filter to remove signals above the dither frequency, $\omega_g$,
    an AGC unit to maintain a constant signal level, and
    a high pass filter to remove signals below the dither frequency, $\omega_g$.

4. An automatic bandwidth control system as described in claim 1 wherein the gain parameter is adjustable.

5. An automatic bandwidth control system as described in claim 1 wherein said multiplier means operates as a synchronous detector.

6. An automatic bandwidth control system as described in claim 2 wherein said unit amplitude sine wave operates at the dither frequency, $\omega_g$.

* * * * *